US008437793B2

(12) United States Patent
Donovan et al.

(10) Patent No.: US 8,437,793 B2
(45) Date of Patent: May 7, 2013

(54) WIRELESS TRANSMITTER CALIBRATION USING ABSOLUTE POWER REQUESTS

(75) Inventors: David A. Donovan, Oakland, CA (US); Justin Gregg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 554 days.

(21) Appl. No.: 12/625,534

(22) Filed: Nov. 24, 2009

(65) Prior Publication Data

US 2011/0124364 A1 May 26, 2011

(51) Int. Cl.
*H04Q 7/32* (2006.01)
(52) U.S. Cl.
USPC ............. 455/522; 455/69; 455/423; 455/425; 455/517; 455/67.11; 370/241; 370/328; 370/329; 370/338; 370/343
(58) Field of Classification Search .................. 455/522, 455/69, 127.1, 500, 517, 67.11, 423–425, 455/422.1, 403, 550.1, 426.1, 426.2, 67.12–67.16, 455/68; 370/241, 328, 329, 338, 343
See application file for complete search history.

(56) References Cited

U.S. PATENT DOCUMENTS

| | | | |
|---|---|---|---|
| 4,137,499 A | | 1/1979 | Caudel |
| 6,603,359 B2 * | | 8/2003 | Fujiwara et al. ............... 330/310 |
| 6,735,422 B1 | | 5/2004 | Baldwin et al. |
| 6,819,910 B2 | | 11/2004 | Shi et al. |
| 6,819,938 B2 | | 11/2004 | Sahota |
| 7,110,469 B2 | | 9/2006 | Shi et al. |
| 7,148,699 B1 | | 12/2006 | Stark |
| 7,881,680 B1 | | 2/2011 | Viehweg et al. |
| 8,095,089 B1 * | | 1/2012 | Viehweg et al. ............ 455/114.3 |
| 8,254,405 B2 * | | 8/2012 | Price .............................. 370/431 |
| 2004/0203443 A1 | | 10/2004 | Woolf et al. |
| 2006/0160534 A1 | | 7/2006 | Jung et al. |
| 2008/0002786 A1 | | 1/2008 | Kerth et al. |
| 2008/0020746 A1 | | 1/2008 | Alexandar et al. |
| 2008/0057874 A1 | | 3/2008 | Shvodian et al. |
| 2008/0182530 A1 | | 7/2008 | Mueller et al. |
| 2008/0268789 A1 | | 10/2008 | Plaumann et al. |
| 2008/0278263 A1 * | | 11/2008 | Scranton ....................... 333/187 |
| 2009/0197547 A1 * | | 8/2009 | Wang ......................... 455/127.1 |
| 2009/0298440 A1 * | | 12/2009 | Takeya et al. .............. 455/67.14 |

OTHER PUBLICATIONS

"R&S CMU200 Universal Radio Communication Tester", Rohde & Schwarz, Nov. 2007.

* cited by examiner

*Primary Examiner* — Keith Ferguson
(74) *Attorney, Agent, or Firm* — Treyz Law Group; G. Victor Treyz; Chih-Yun Wu (57) ABSTRACT

Test systems are provided for performing testing and calibration operations on wireless circuitry in electronic devices. The electronic devices may include cellular telephones and other portable electronic devices. Wireless circuitry in a device may include a radio-frequency transceiver that is controlled based on radio-frequency transceiver control signals. The wireless circuitry may also include power amplifier circuitry. The power amplifier circuitry may receive radio-frequency signals from the transceiver and may produce correspondingly amplified radio-frequency output signals for wireless transmission with an antenna. The power amplifier circuitry may be powered by a bias voltage. The test systems may provide the electronic device with a transmit power request that directs the electronic device to produce a desired output power. The test systems may measure the actual resulting power. After sufficient measurements have been made, the test systems may calibrate the transceiver and power amplifier settings.

17 Claims, 8 Drawing Sheets

| POUT | VBIAS | DAC |
|---|---|---|
| $P_1$ | VBIAS1 | DAC1 |
| $P_2$ | VBIAS2 | DAC2 |
| $P_3$ | VBIAS3 | DAC3 |
| ⋮ | | |

WIRELESS TRANSMITTER CALIBRATION USING ABSOLUTE POWER REQUESTS

BACKGROUND

This invention relates generally to wireless communications circuitry, and more particularly, to calibrating wireless communications circuitry.

Handheld electronic devices and other portable electronic devices are becoming increasingly popular. Examples of handheld devices include handheld computers, cellular telephones, media players, and hybrid devices that include the functionality of multiple devices of this type. Popular portable electronic devices that are somewhat larger than traditional handheld electronic devices include laptop computers and tablet computers.

Due in part to their mobile nature, portable electronic devices are often provided with wireless communications capabilities. For example, handheld electronic devices may use long-range wireless communications to communicate with wireless base stations. Cellular telephones and other devices with cellular capabilities may communicate using cellular telephone bands. Electronic devices may also use short-range wireless communications links. For example, portable electronic devices may communicate using the Wi-Fi® (IEEE 802.11) bands at 2.4 GHz and 5.0 GHz and the Bluetooth® band at 2.4 GHz. Communications are also possible in data service bands such as the 3G data communications band at 2170 MHz (commonly referred to as UMTS or Universal Mobile Telecommunications System band).

Proper operation of the wireless circuitry in an electronic device typically requires calibration. When operated with default settings, electronic devices may, for example, produce radio-frequency output power levels that differ somewhat from expected levels. If these discrepancies are too large in a device, the device may not operate as intended. For example, the device might not transmit signals with sufficient strength during operation, leading to dropped calls or other disruptions in wireless service.

With conventional calibration techniques, amplifier bias voltages and other settings in a device are adjusted while measuring resulting output power levels. Measurement results are then processed in an attempt to estimate properly calibrated values for the settings. Traditionally, there is a complex interplay between the different settings used to operate a device, so the process of making measurements and estimating calibration values may not always be sufficiently accurate.

It would therefore be desirable to be able to improve calibration techniques for wireless devices such as portable electronic devices.

SUMMARY

The wireless circuitry in an electronic device may include a transceiver that is controlled by transceiver control signals. The transceiver may produce radio-frequency signals at a power that is adjusted based on the transceiver control signals. A power amplifier may be biased at a bias voltage. The power amplifier may amplify the radio-frequency signals that are produced by the transceiver. The power amplifier gain may be adjusted based on amplifier control signals. Corresponding amplified radio-frequency output signals may be wirelessly transmitted using an antenna.

A connector may be interposed in the output path between the power amplifier circuitry and the antenna. During testing, a probe may be connected to the connector to route transmitted radio-frequency signals to a power meter.

Test equipment may provide the electronic device with transmit power requests that direct the electronic device to transmit the radio-frequency output signals at a desired output power. The test equipment may use the probe and the power meter to measure the actual output power that is produced by the power amplifier circuitry in response to each transmit power request.

The transmit power requests and the actual resulting output powers may be analyzed to produce calibration data for the electronic device. The calibration data may be provided in the form of offsets, function parameters, or other corrective information and may be programmed into the electronic device following testing.

Further features of the invention, its nature and various advantages will be more apparent from the accompanying drawings and the following detailed description of the preferred embodiments.

DETAILED DESCRIPTION

This relates generally to wireless communications, and more particularly, to calibration of wireless communications circuitry in wireless electronic devices.

The wireless electronic devices may be portable electronic devices such as laptop computers or small portable computers of the type that are sometimes referred to as ultraportables. The wireless electronic devices may also be somewhat smaller devices. Examples of smaller wireless electronic devices include wrist-watch devices, pendant devices, headphone and earpiece devices, and other wearable and miniature devices. With one suitable arrangement, the wireless electronic devices may be portable electronic devices such as handheld electronic devices.

The wireless devices may media players with wireless communications capabilities, handheld computers (also sometimes called personal digital assistants), remote controllers, global positioning system (GPS) devices, handheld gaming devices, or cellular telephones. The wireless electronic devices may also be devices that combine the functionality of multiple conventional devices. An example of a hybrid device is a cellular telephone that includes media player functionality, communications functions, web browsing capabilities, and support for a variety of other business and entertainment applications such as the iPhone® cellular telephone available from Apple Inc. of Cupertino, Calif. These are merely illustrative examples.

Figure 1:
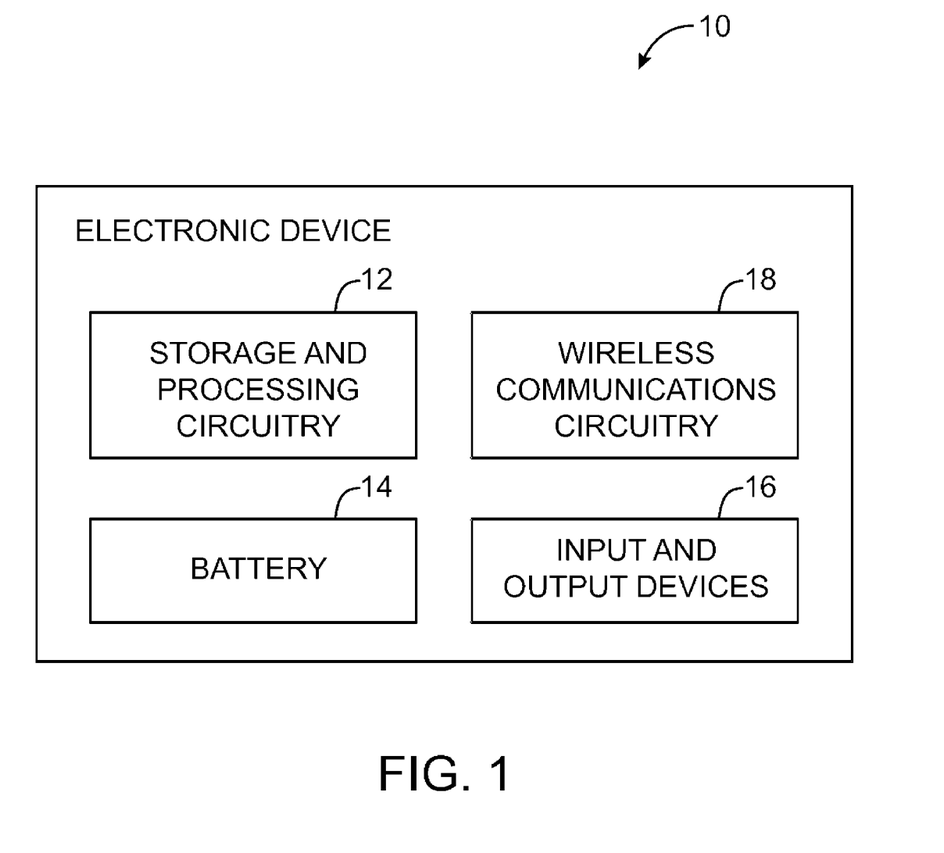
FIG. 1 is a diagram of an illustrative electronic device with wireless communications circuitry suitable for calibration in accordance with an embodiment of the present invention.

A schematic diagram of an embodiment of an illustrative wireless electronic device such as a handheld electronic device is shown in FIG. 1. As shown in FIG. 1, device 10 may include storage and processing circuitry 12. Storage and processing circuitry 12 may include one or more different types of storage such as hard disk drive storage, nonvolatile memory (e.g., flash memory or other electrically-programmable-read-only memory), volatile memory (e.g., static or dynamic random-access-memory), etc. Storage and processing circuitry 12 may be used in controlling the operation of device 10. For example, settings that are stored in storage and processing circuitry 12 may be used in controlling the operation of device 10. Processing circuitry in circuitry 12 may be based on processors such as microprocessors, microcontrollers, digital signal processors, dedicated processing circuits, power management circuits, audio and video chips, and other suitable integrated circuits.

With one suitable arrangement, storage and processing circuitry 12 may be used to run software on device 10, such as internet browsing applications, voice-over-internet-protocol (VOIP) telephone call applications, email applications, media playback applications, operating system functions, etc. Storage and processing circuitry 12 may be used in implementing suitable communications protocols. Communications protocols that may be implemented using storage and processing circuitry 12 include internet protocols, wireless local area network protocols (e.g., IEEE 802.11 protocols—sometimes referred to as Wi-Fi®), protocols for other short-range wireless communications links such as the Bluetooth® protocol, protocols for handling 2G and 3G cellular telephone communications services, etc.

Device 10 may have one or more batteries such as battery 14. To minimize power consumption and thereby extend the life of battery 14, storage and processing circuitry 12 may be used in implementing power management functions for device 10.

Input-output devices 16 may be used to allow data to be supplied to device 10 and to allow data to be provided from device 10 to external devices. Examples of input-output devices 16 that may be used in device 10 include display screens such as touch screens (e.g., liquid crystal displays, organic light-emitting diode displays, electronic ink displays, etc.), buttons, joysticks, click wheels, scrolling wheels, touch pads, key pads, keyboards, microphones, speakers and other devices for creating sound, cameras, sensors, etc. A user can control the operation of device 10 by supplying commands through devices 16. Devices 16 may also be used to convey visual or sonic information to the user of device 10. Devices 16 may include connectors for forming data ports (e.g., for attaching external equipment such as computers, accessories, etc.).

Wireless communications devices 18 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications).

Storage and processing circuitry 12 may control wireless communications circuitry 18. For example, storage and processing circuitry 12 may be used to adjust the gain of radio-frequency power amplifier circuitry on device 10 and may be used in adjusting input power levels provided to the input of radio-frequency power amplifier circuitry on device 10 from a transceiver circuit. Storage and processing circuitry 12 may also be used to adjust the power supply voltages (bias voltages) that are used in powering the radio-frequency power amplifier circuitry. These adjustments may be made automatically in real time based on calibration data and operating algorithms (software). For example, code may be stored in storage and processing circuitry 12 that configures storage and processing circuitry 36 to implement a control scheme in which operating parameters are adjusted in accordance with calibrated settings (calibrated operating parameters) to produce desired transmit powers (output powers) while meeting other desired performance criteria such as desired adjacent channel leakage ratio values and while minimizing power consumption.

Device 10 can communicate with external devices such as accessories, computing equipment, and wireless networks over wired and wireless communications paths.

For example, accessories such as wired or wireless headsets may communicate with device 10. Device 10 may also be connected to audio-video equipment (e.g., wireless speakers, a game controller, or other equipment that receives and plays audio and video content), or a peripheral such as a wireless printer or camera.

Device 10 may use a wired or wireless path to communicate with a personal computer or other computing equipment. The computing equipment may be, for example, a computer that has an associated wireless access point (router) or an internal or external wireless card that establishes a wireless connection with device 10. The computer may be a server (e.g., an internet server), a local area network computer with or without internet access, a user's own personal computer, a peer device (e.g., another portable electronic device 10), or any other suitable computing equipment. During test and calibration operations, device 10 may communicate with test and calibration equipment (e.g., a calibration tool) that includes computing equipment.

Device 10 can also communicate with wireless network equipment, such as cellular telephone base stations, cellular towers, wireless data networks, computers associated with wireless networks, etc. Such wireless networks may include network management equipment that monitors the wireless signal strength of the wireless handsets such as device 10 that are in communication with the network. To improve the overall performance of the network and to ensure that interference between handsets is minimized, the network management equipment may send power adjustment commands (sometimes referred to as transmit power control commands) to each handset. The transmit power control settings that are provided to the handsets direct handsets with weak signals to increase their transmit powers, so that their signals will be properly received by the network. At the same time, the transmit power control settings may instruct handsets whose signals are being received clearly at high power to reduce their transmit power control settings. This reduces interference between handsets and allows the network to maximize its use of available wireless bandwidth.

When devices such as device 10 receive transmit power control settings from the network or at other suitable times, each device 10 may make suitable transmission power adjustments. For example, a device may adjust the power level of signals transmitted from transceiver circuitry to radio-frequency power amplifiers on the device and may adjust the radio-frequency power amplifiers. Adjustments such as these may include gain mode settings adjustments and power supply voltage adjustments.

The output signals from the power amplifiers on devices 10 are wirelessly transmitted from device 10 to suitable receivers using antennas in devices 10.

The settings for wireless communications circuitry 18 may include gain mode adjustments that control the gain settings of power amplifiers. For example, a gain mode adjustment may control whether a power amplifier is operating in a high gain mode in which all power amplifier stages that are available are being used or a low gain mode in which one or more of the gain stages on the power amplifier have been shut down to conserve power. Power supply voltage adjustments may be used to help minimize power consumption at a given gain setting. In typical circuit architectures, a transceiver circuit may supply radio-frequency signals to the input of a power amplifier for transmission through an antenna. The power at which the transceiver circuit outputs these radio-frequency signals establishes an input power level (sometimes referred to herein as Pin) for the power amplifier. Input power adjustments (adjustments to Pin) can be made to adjust the power of radio-frequency signals transmitted by device 10.

The antenna structures and wireless communications devices of device 10 may support communications over any suitable wireless communications bands. For example, wireless communications devices 18 may be used to cover communications frequency bands such as cellular telephone voice and data bands at 850 MHz, 900 MHz, 1800 MHz, 1900 MHz, and the communications band data at 2170 MHz band (commonly referred to as a UMTS or Universal Mobile Telecommunications System band), the Wi-Fi® (IEEE 802.11) bands at 2.4 GHz and 5.0 GHz (also sometimes referred to as wireless local area network or WLAN bands), the Bluetooth® band at 2.4 GHz, and the global positioning system (GPS) band at 1550 MHz.

Device 10 can cover these communications bands and other suitable communications bands with proper configuration of the antenna structures in wireless communications circuitry 18. Any suitable antenna structures may be used in device 10. For example, device 10 may have one antenna or may have multiple antennas. The antennas in device 10 may each be used to cover a single communications band or each antenna may cover multiple communications bands. If desired, one or more antennas may cover a single band while one or more additional antennas are each used to cover multiple bands.

Figure 2:
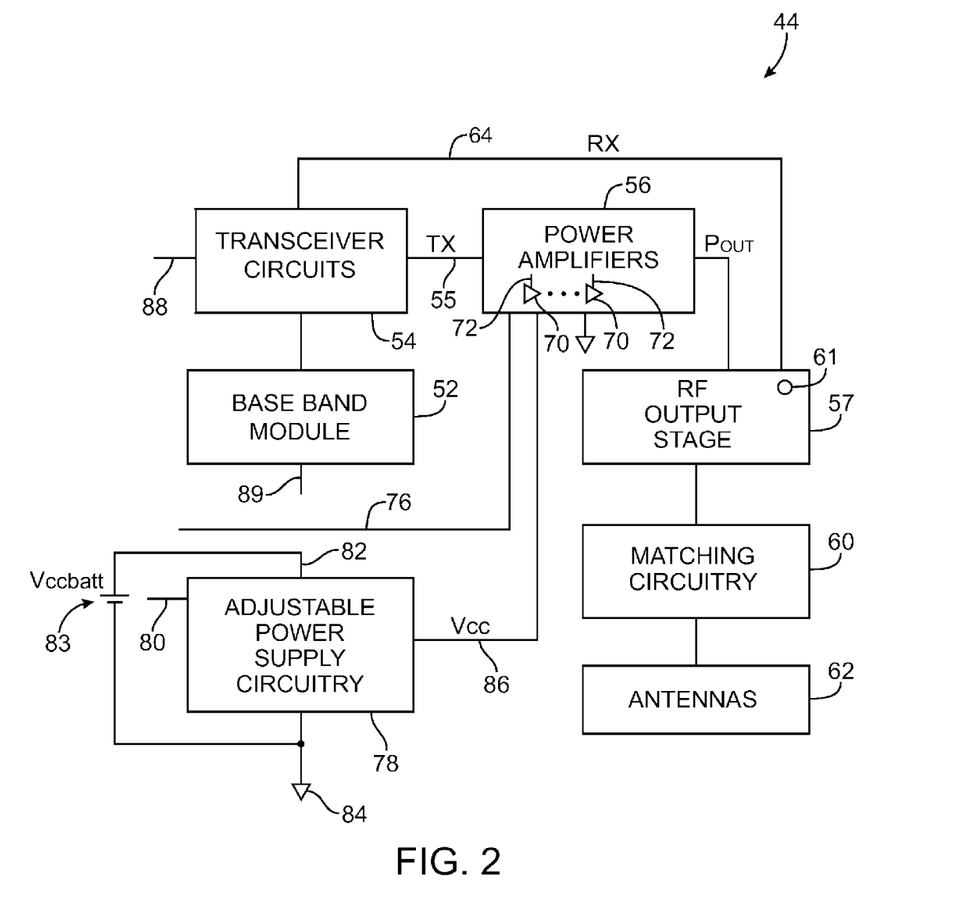
FIG. 2 is a circuit diagram of illustrative wireless communications circuitry that may be used in an electronic device calibrated in accordance with an embodiment of the present invention.

Illustrative wireless communications circuitry that may be used in circuitry 18 of FIG. 1 in device 10 is shown in FIG. 2. As shown in FIG. 2, wireless communications circuitry 44 may include one or more antennas such as antennas 62. Data signals that are to be transmitted by device 10 may be provided to baseband module (e.g., from storage and processing circuitry 12 of FIG. 1). Baseband module 52 may be implemented using a single integrated circuit (e.g., a baseband processor integrated circuit) or using multiple circuits.

Baseband processor 52 may receive signals to be transmitted over antenna 62 at input line 89 (e.g., from storage and processing circuitry 12). Baseband processor 52 may provide signals that are to be transmitted to transmitter circuitry within RF transceiver circuitry 54. The transmitter circuitry may be coupled to power amplifier circuitry 56 via path 55.

Control path 88 may receive control signals from storage and processing circuitry 12 (FIG. 1). These control signals may be used to control the power of the radio-frequency signals that the transmitter circuitry within transceiver circuitry 54 supplies to the input of power amplifiers 56 via path 55. This transmitted radio-frequency signal power level is sometimes referred to herein as Pin, because it represents the input power to power amplifier circuitry 56.

During data transmission, power amplifier circuitry 56 may boost the output power of transmitted signals to a sufficiently high level to ensure adequate signal transmission. Radio-frequency (RF) output stage circuitry 57 may contain radio-frequency switches and passive elements such as duplexers and diplexers. The switches in RF output stage circuitry 57 may, if desired, be used to switch circuitry 44 between a transmitting mode and a receiving mode. Duplexer and diplexer circuits and other passive components in RF output stage 57 may be used to route input and output signals based on their frequency. A connector in stage 57 such as connector 61 may allow an external cable to be connected to device 10. The external cable may be associated with a test equipment probe and may be used to tap into the outgoing radio-frequency signals and thereby measure Pout during calibration.

Matching circuitry 60 may include a network of passive components such as resistors, inductors, and capacitors and ensures that antenna structures 62 are impedance matched to the rest of circuitry 44. Wireless signals that are received by antenna structures 62 may be passed to receiver circuitry in transceiver circuitry 54 over a path such as path 64. A low noise amplifier in the receiver circuitry of transceiver circuits 54 may be used to amplify incoming wireless signals from path 64.

Each power amplifier (e.g., each power amplifier in power amplifiers 56) may include one or more power amplifier stages such as stages 70. As an example, each power amplifier may be used to handle a separate communications band and each such power amplifier may have three series-connected power amplifier stages 70. Stages 70 may have control inputs such as inputs 72 that receive control signals. The control signals may be provided using a control signal path such as path 76. In a typical scenario, storage and processing circuitry 12 (FIG. 1) may provide control signals to stages 70 using a path such as path 76 and paths such as paths 72. The control signals from storage and processing circuitry 12 may be used to selectively enable and disable stages 70.

By enabling and disabling stages 70 selectively, the power amplifier may be placed into different gain modes. For example, the power amplifier may be placed into a high gain mode by enabling all three of power amplifier stages 70 or may be placed into a low gain mode by enabling two of the power amplifier stages. Other configurations may be used if desired. For example, a very low gain mode may be supported by turning on only one of three gain stages or arrangements with more than three gain mode settings may be provided by selectively enabling other combinations of gain stages (e.g., in power amplifiers with three or more than three gains stages).

Adjustable power supply circuitry such as adjustable power supply circuitry 78 may be powered by voltage source 83. Voltage source 83 may be, for example, a battery such as battery 14 of FIG. 1. Source 83 may supply a positive battery voltage to adjustable power supply circuitry 78 at positive power supply terminal 82 and may supply a ground voltage to adjustable power supply circuitry 78 at ground power supply terminal 84. Source 83 may be implemented using a lithium ion battery, a lithium polymer battery, or a battery of any other suitable type.

Initially, the voltage supplied by battery source 83 may be high. As the battery becomes depleted, the voltage supplied by the battery will tend to drop. By using adjustable power supply circuitry 78, the amount of voltage that is supplied to power amplifier circuitry 56 over power supply voltage path 86 may be maintained at a desired value. For example, power supply circuitry 78 may, under appropriate conditions, receive a raw battery voltage from source 83 that drops with time and may produce a relatively constant bias voltage Vbias (e.g., voltage Vcc in FIG. 2) on output path 86. This may help to avoid wasteful situations in which the circuitry of power amplifiers 56 is supplied with excessive voltages while the battery of source 83 is fresh. Such excessive voltages may lead to wasteful power consumption by circuitry 56.

Adjustable power supply circuitry 78 may be controlled by control signals received over a path such as path 80. The control signals may be provided to adjustable power supply circuitry 78 from storage and processing circuitry 12 (FIG. 1) or any other suitable control circuitry. The control signals on path 80 may be used to adjust the magnitude of the power amplifier bias voltage that is provided to power amplifier circuitry 56 over path 86. These power supply voltage adjustments may be made at the same time as gain mode adjustments are being made to the power amplifier circuitry 56 and at the same time that adjustments are being made to the power (Pin) on path 55. By making these adjustments, desired output power levels Pout may be produced as needed.

For example, if a transmit power control (TPC) command is received from the cellular network that directs device 10 to produce 23 dBm of output power, power amplifier bias Vbias, the output power Pin, and the gain setting of power amplifiers 56 may be adjusted as needed so as to accurately produce 23 dBm of radio-frequency signal power at the output of power amplifiers 56. Neglecting the losses in stage 57, matching circuitry 60, and antennas 62 (which can be taken into account by device 10), these settings will result in 23 dBm of wirelessly transmitted radio-frequency signal power, while satisfying other desired operating criteria (e.g., ACLR, etc.).

Transceiver circuitry 54 may contain a digital-to-analog converter that receives digital control values (sometimes referred to as DAC values, DAC signals, transceiver control signals, or transceiver control signal values) on path 88. These DAC values control the operation of digital-to-analog converter circuitry in transceiver 54 that adjusts the value of Pin. The range of possible DAC values that are used in controlling Pin depends on the type of digital-to-analog converter circuitry used in transceiver circuitry 54. Valid DAC values may, for example, range from 0 to 1024. As an example, when the control input to transceiver circuitry 54 is low in this type of configuration (e.g., the DAC value on path 88 is near 0), the value of power Pin will be low; when the control input to transceiver 54 is high (e.g., when the DAC value on path 88 is near 1024) the value of power Pin will be high.

When device 10 receives a TPC command asking device 10 to produce a particular output power Pout or when device 10 otherwise desires to produce a particular value of Pout, device 10 can consult calibrated settings stored in storage and processing circuitry 12. These calibrated settings may identify proper values for the control signals used in operating circuitry 44 as a function of desired output power. If, for example, Pout has a desired value of 24 dBm, device 10 may identify a particular set of settings to use (e.g., a particular number of gain stages that are activated in power amplifiers 56, a particular calibrated DAC value for path 88, and a particular calibrated bias voltage Vbias for biasing power amplifiers 56). By using calibrated operating parameters, device 10 will accurately produce desired amounts of radio-frequency output power.

In a typical scenario, calibration of power amplifiers 56 when operating in a high gain mode (i.e., with all gain stages active) can be extrapolated to operations at lower gain settings (e.g., a low gain mode). Accordingly, it is generally sufficient to calibrate device 10 when operating in only its high gain mode.

When calibrating device 10, test and calibration equipment may be used to determine which DAC values (transceiver control signal values) and Vbias values (power amplifier control signal values) are needed to produce various corresponding values of Pout. This calibration data may then be stored in device 10 for future use. When a user is using device 10, device 10 can consult the stored calibration data to determine appropriate DAC and Vbias values to use in producing desired levels of output power.

Figure 3:
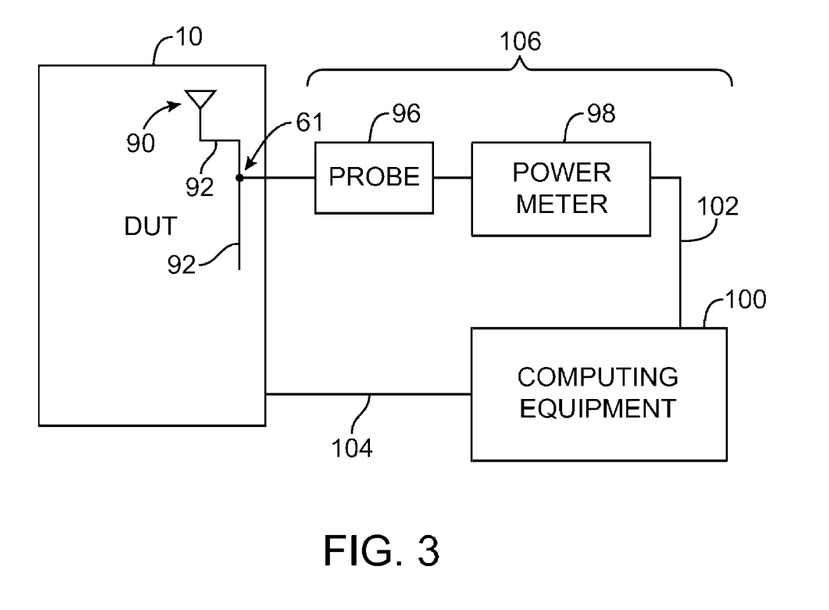
FIG. 3 is a diagram of an illustrative test equipment that may be used in accordance with an embodiment of the present invention.

An illustrative system environment in which a device may be tested and calibrated is shown in FIG. 3. Arrangements of the type shown in FIG. 3 may be used in a factory or other facility in which test and calibration operations are performed. The FIG. 3 example involves the use of test and calibration equipment 106 to perform both test operations and calibration operations. If desired, separate test equipment and calibration equipment systems may be used (e.g., at one or more different manufacturing and/or test facilities). The use of test and calibration equipment 106 in FIG. 3 is merely illustrative.

As shown in FIG. 3, equipment 106 may include a radio-frequency signal probe such as probe 96. Probe 96 may be connected to connector 61 to tap into the transmitted radio-frequency output signals that are being conveyed over path 92 to antenna 90. When probe 96 is not present, all radio-frequency signals may pass to antenna 90. When probe 96 is inserted in connector 61 during testing, the radio-frequency signals may be routed to power meter 98 via probe 96.

Radio-frequency power meter 98 may produce analog or digital output signals indicative of the amount of radio-frequency power that is received from probe 96. Radio-frequency power meter 98 may be coupled to computing equipment 100 via path 102. Computing equipment 100 may be based on custom testing and calibration chips, one or more microprocessors, digital signal processors, or other processors, one or more networked general purpose computers, or other suitable computing equipment. Computing equipment 100 may be coupled to device 10 via cable 104. Cable 104 may contain a pair of signal wires, four signal lines (e.g., a pair of power lines and a pair of data lines in a Universal Serial Bus cable), a parallel set of lines (e.g. in a high-speed parallel data bus), or any other suitable electronic path. If desired, path 104 may include a wireless path (e.g., an IEEE 802.11 wireless link).

In a typical scenario, path 104 is used to convey control signals to device 10 during testing. For example, path 104 may be used to send a power request command to device 10 that directs device 10 to transmit radio-frequency signals at a particular output power level (Pout). Power meter 98 may then be used to measure the resulting actual radio-frequency power that is transmitted. After a sufficient number of measurements have been made, device 10 may be calibrated by storing appropriately calibrated operating settings in device 10 (e.g., using path 104). If desired, calibrated settings may be stored separately (e.g., by loading device 10 with calibration settings using different equipment than equipment 106).

As described in connection with FIG. 2, the transmitted output power from a device may be affected by DAC values (control signals for the transceiver) and by power amplifier bias voltage Vbias and associated control signals. In a typical device, there is a complex interplay between various transceiver control signal values, power amplifier Vbias, power amplifier control signals and resulting output power levels. In some cases this relationship may not be well defined or actual the control signal values may be unavailable. In other cases, the optimal control values may be dependent on the actual output power of the device. This complexity can lead to inaccuracies when using conventional calibration techniques. Further, the relationships between the control values may lead to a necessity for an iterative based calibration method.

Figure 4:
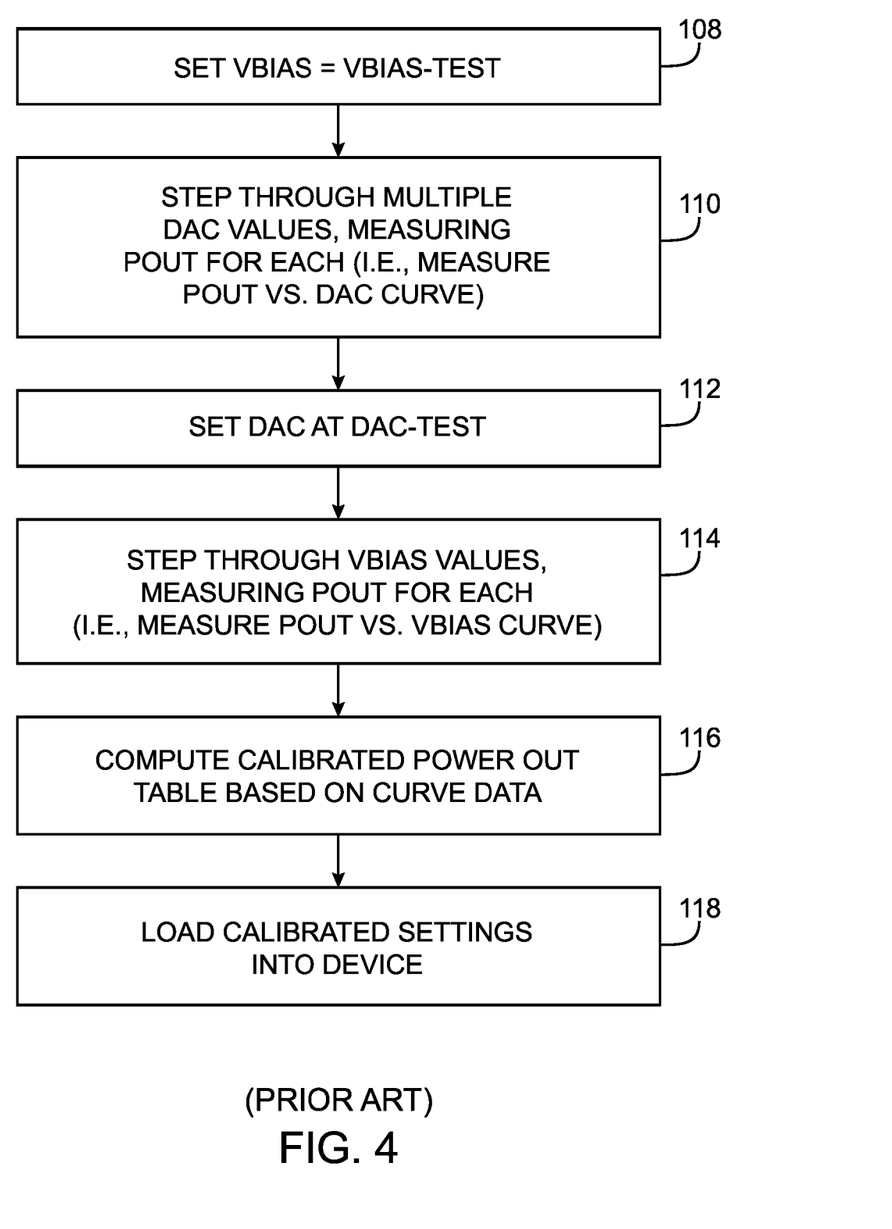
FIG. 4 is a flow chart of steps used in a conventional cellular telephone radio-frequency transmitter calibration process.

Consider, as an example, the conventional testing scheme of FIG. 4.

At step 108, test equipment directs a device under test to bias its power amplifier at a fixed known bias voltage Vbias-test.

At step 110, the test equipment uses individual commands or a batch process to load a series of DAC values into the device while directing the device to produce an output power Pout for each loaded DAC value. At the same time, the test equipment measures the resulting actual output powers Pactual corresponding to each loaded DAC value. This operation allows the test equipment to capture a Pactual versus DAC curve for a particular Vbias value (Vbias-fixed).

A similar process is then used to characterize output power as a function of power amplifier bias voltage at a given DAC setting. The fixed DAC setting is established at step 112.

At step 114, using a step-by-step approach or using a batch process, the test equipment instructs the device under test to produce a series of output powers Pout corresponding to each of a series of different bias voltages Vbias. While instructing the device under test to produce output powers in this way, the test equipment measures the resulting actual output powers. The operations of steps 112 and 114 therefore allow the test equipment to capture a Pactual versus Vbias curve at the fixed DAC setting.

Once these characterizing curves have been captured, modeling operations may be performed at step 116 in an attempt to estimate optimum Vbias and DAC settings to use at each of multiple Pout values. This computed information may be stored in an output power table and is therefore sometimes referred to as calibrated output power table data or an output power curve. The output power curve is loaded into the device under test at step 118.

Although it is generally better to calibrate a device using the conventional calibration technique of FIG. 4 than to forgo calibration completely, conventional calibration processes of this type may not always be sufficiently accurate. Because of the complex interplay between DAC settings and Vbias settings, procedures that manually adjust one of these operating parameters while holding the other constant are unable to reflect changes to the output power that arise only when both parameters are changed simultaneously (e.g., nonlinearities). Further, there may be more large set of possible control signal settings, making it undesirable to step through all possible combinations.

Figure 5:
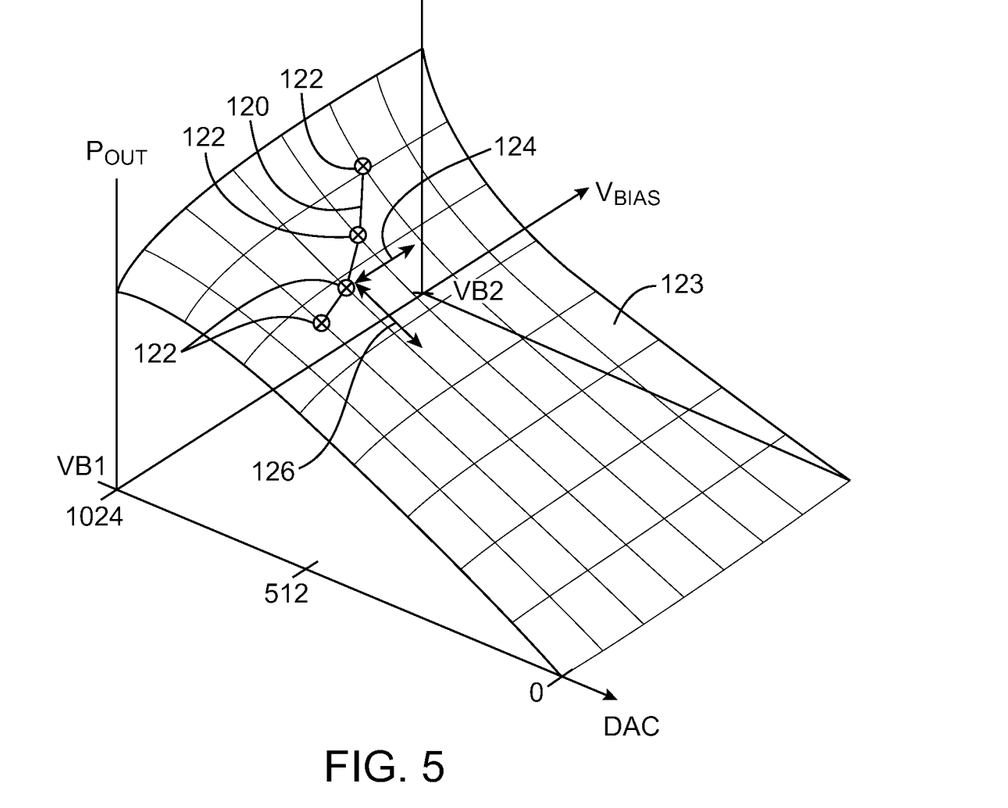
FIG. 5 is a graph showing how output power may vary as a function of transceiver digital-to-analog converter (DAC) values and power amplifier bias values in accordance with an embodiment of the present invention.

The graph of FIG. 5 illustrates how changes in both DAC and Vbias settings may influence the amount of transmitted power from device 10 (i.e., Pout). In the FIG. 5 graph, Pout has been plotted as a function of DAC value and Vbias value for a range of Vbias values between VB1 (a non-zero minimum bias voltage) and VB2 (an illustrative maximum bias voltage) and for a range of DAC values between a minimum of 0 and a maximum of 1024.

At low values of the DAC setting (e.g., when DAC is zero), the output power Pout is low (e.g., 0), regardless of the amount of Vbias. This is because the output power of transceiver circuitry 54 is low (e.g., 0). At a given non-zero DAC value, power Pout rises with increases in Vbias. The curve shapes for all possible combinations of DAC value and Vbias value give rise to a complex output power "surface" (i.e., warped non-planar two-dimensional surface 123). The non-planar nature of surface 123 is due to the nonlinear interactions between DAC value and Vbias value when producing powers Pout.

Figure 6:
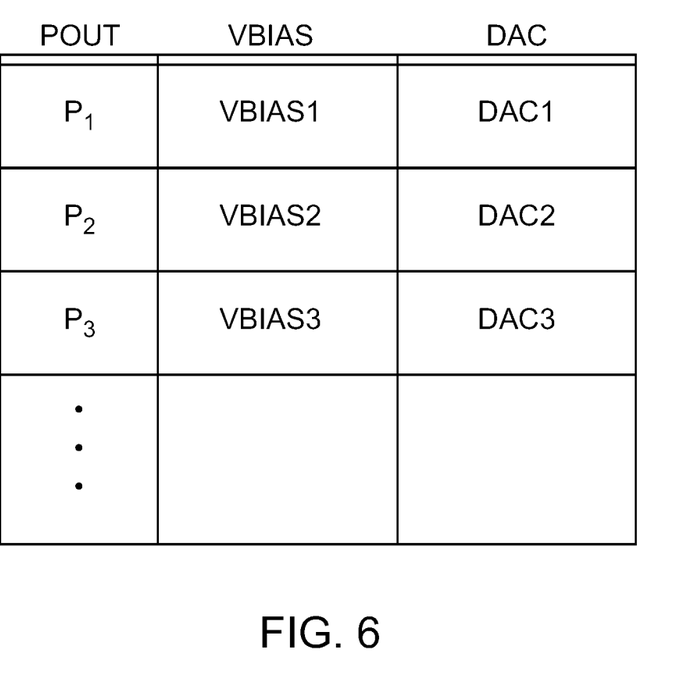
FIG. 6 is an output power settings table showing an illustrative set of power amplifier bias voltages and transceiver digital-to-analog converter settings that may be used in producing a desired set of radio-frequency output powers in an electronic device in accordance with an embodiment of the present invention.

During operation of device 10, device 10 produces various desired output power levels (e.g., in response to received TPC commands). For each given value of desired output power, the output power curve in device 10 can be used to produce a corresponding pair of optimal values for DAC and Vbias. The relationship between output power Pout and the optimal values of DAC and Vbias is represented graphically as output power curve 120 in FIG. 5 and are represented as entries in an output power table in FIG. 6. At each point 122 on curve 120 of FIG. 5, the values of DAC and Vbias on curve 120 correspond to calibrated optimal settings to use to produce the corresponding value of Pout at that point 122.

In a properly calibrated device, the values of output power curve 120 are stored in memory in the device (e.g., in the form of the table of FIG. 6) and can be used to determine the appropriate DAC and Vbias settings to use under each required Pout condition.

Conventional calibration techniques of the type described in connection with FIG. 4 attempt to approximate the complex warped shape of surface 123 with a plane. During conventional operations such as steps 110 and 112 of FIG. 4, the test equipment captures curve 126 of FIG. 5. Conventional operations such as steps 114 and 116 of FIG. 5 are used to capture curve 124. Based on curves 126 and 124, and based on the modeling assumptions of step 116 (e.g., assuming surface 123 is planar), the test equipment then attempts to compute the shape of curve 120. Because this type of independent measurement of curves 124 and 136 is unable to take into account complex non-linear interactions between Vbias and DAC value and other control signals, conventional calibration techniques are not generally able to compute curve 120 accurately. This leads to potential calibration errors when a conventionally calibrated version of curve 120 is programmed into a device.

Figure 7:
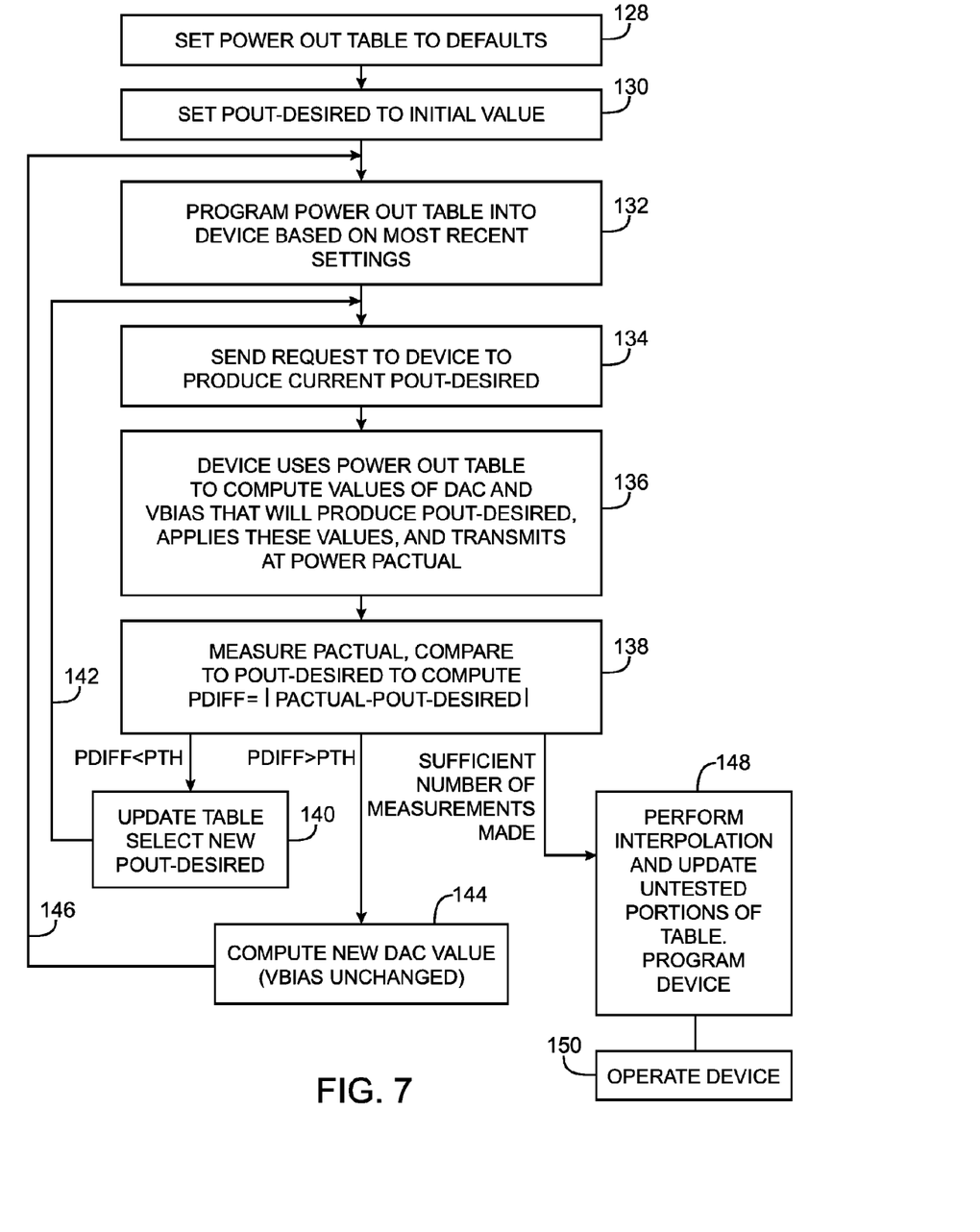
FIG. 7 is a flow chart of illustrative steps involved in using test equipment to calibrate a wireless device in accordance with an embodiment of the present invention.

Illustrative steps involved in testing and calibrating device 10 using test and calibration equipment of the type shown in FIG. 3 are shown in FIG. 7.

At step 128, the power out table for device 10 (e.g., the power out table of FIG. 6) may be initialized (e.g., set to default values). The default values may be chosen based on an initial set of measurements on a typical device, may be improved over time (e.g., by training based on a number of data samples), etc.

At step 130, an initial value may be chosen for the desired output power for device 10 (i.e., desired output power Pout-desired may be set to an initial value of Pinit).

At step 132, the power output table may be programmed into device 10 (e.g., using path 104). The initial programming operations of step 132 will involve programming a default table into device 10. Subsequent programming operations will involve the programming of successively more calibrated tables into device 10.

At step 134, test equipment 100 may be used to send an output power request (radio-frequency wireless transit power request) to device 10 (e.g., over path 104). The output power request includes a command directing device 10 to transmit a radio-frequency signal of output power Pout equal to the current value of Pout-desired (i.e., the value that, at least initially, was initialized to the initial value Pinit at step 130).

At step 136, device 10 uses the stored output power table (also sometimes referred to as the power out table or output power curve) to determine which values of DAC and Vbias are to be used in producing Pout-desired. After determining which DAC and Vbias values to use by looking up these values in the output power table (i.e., by applying the current version of the output power curve), device 10 will produce an output power of magnitude Pactual.

At step 138, test and calibration equipment 106 may use probe 96, power meter 98, and computing equipment 100 to measure and store the magnitude of Pactual. Computing equipment 100 may then compare the measured and stored output powers. For example, computing equipment 100 may compute the absolute magnitude of Pactual minus Pout-desired. The resulting value (Pdiff) can be compared to a threshold power value Pth. The magnitude of Pth represents the maximum acceptable divergence between the actual output power and the intended output power for device 10 (i.e., the maximum allowable error).

If Pdiff is more than Pth, computing equipment 100 can conclude that additional calibration operations at Pout-desired are needed. A new and more appropriate value of DAC value corresponding to output power Pout-desired can then be computed at step 144. For example, if it was determined that the actual output power Pactual was 10% larger than the desired output power Pout-desired, the operations of step 144 may be used to reduce the DAC value corresponding to Pout-desired by approximately 10%.

During the computations of step 144, the magnitude of Vbias is preferably not changed, so as to avoid introducing bias changes that could adversely affect performance. As an example, Vbias reductions might increase ACLR, which might violate design constraints. By holding Vbias constant during the operations of step 144, the possibility that ACLR specifications might be undesirably violated by changes in Vbias is eliminated. If desired, however, both Vbias and DAC may be changed (e.g., in a weighted fashion). Once the new trial DAC value for Pout-desired has been computed, processing may loop back to step 132, as indicated by line 146.

Once the Pactual and Pout-desired values are sufficiently close (i.e., Pdiff<Pth), the DAC value that has been identified can be stored in the output power table and a new value of Pout-desired can be selected for calibration (step 140). Processing may then loop back to step 134, as indicated by line 142.

Once a sufficient number of values of Pout-desired have been calibrated, the output power table will contain a number of properly calibrated Vbias and Pout settings. The output power table may also contain settings that have not been calibrated. For example, the output power table may contain hundreds of rows, each corresponding to a power value that is offset from its nearest neighbor by 0.1 dBm. During calibration measurements, the table entries at integer output power levels may be calibrated (as an example). For example, the settings in the table may be updated for powers Pout-desired=24 dBm, Pout-desired=23 dBm, Pout-desired=22 dBm, etc. If finer-grained entries are contained in the output power table, interpolation operations may be performed during step 148 based on the known calibrated entries. The original default output power settings in the output power table may then all be replaced with the interpolated (calibrated) data. Once the table has been fully calibrated, the calibrated output power table may be programmed into device 10 (e.g., using equipment 100 to load the data into device 10 over path 104). If desired, the device may be programmed with the calibrated data using different equipment (e.g., at a different portion of the manufacturing line).

Calibrated devices may be operated by a user (step 150). During operation of a calibrated device, the device may receive transmit power commands from an external source such as a cellular network or may otherwise be instructed to produce a particular output power level. When processing a request to produce a particular output power Pout, the calibrated device will use its calibrated output power table entries (i.e., the calibrated output power curve) to produce appropriate values of Vbias, DAC value, and other appropriate settings for wireless communications circuitry 18. Because the performance of the device in responding to these same types of output power requests has already been substantially tested during the calibration operations of FIG. 7, accurate operation is ensured.

Figure 8:
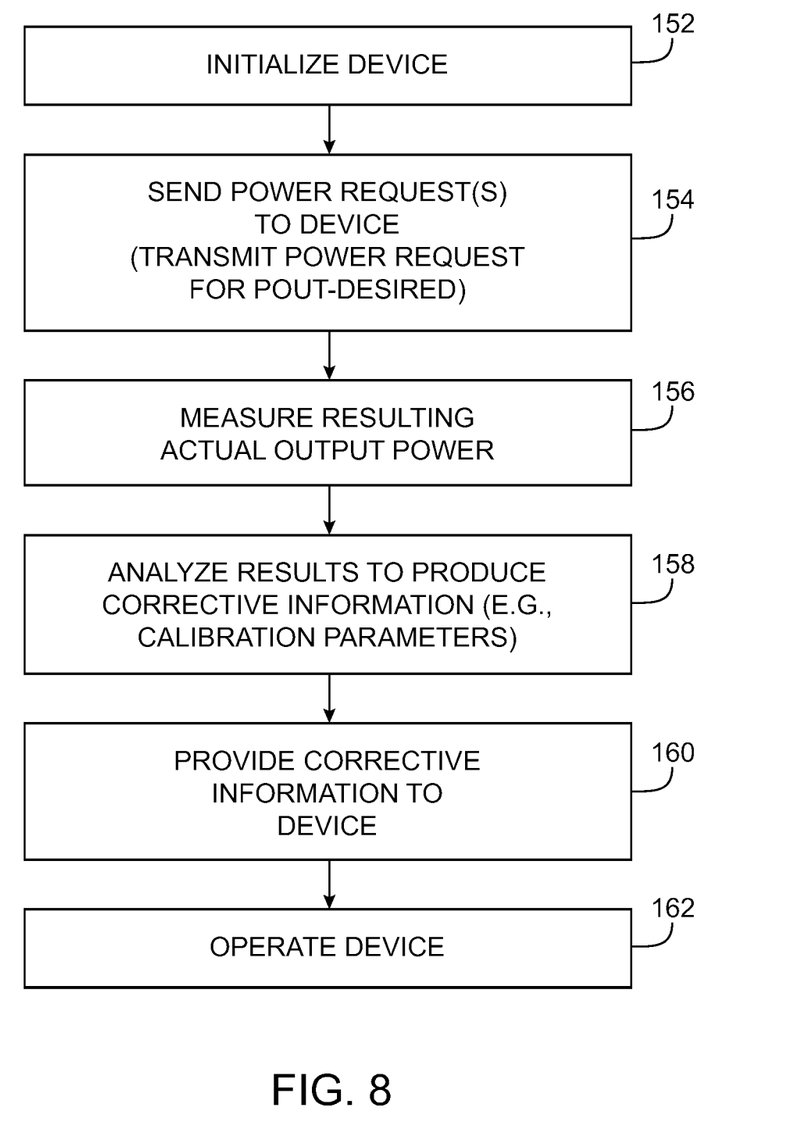
FIG. 8 is a flow chart of illustrative steps involved in using test equipment to perform calibration measurements based on power requests, analyze the calibration measurements to produce corrective information, and provide the corrective information to a wireless device in accordance with an embodiment of the present invention.

FIG. 8 is a generalized flow chart of illustrative steps involved in calibrating a wireless device using transmit power requests.

At step 152, the wireless device may be initialized. For example, default settings may be loaded into device 10 using equipment 106. Default settings may also be loaded into device 10 using other equipment (e.g., default settings may be incorporated into nonvolatile memory in device 10 during a preceding manufacturing operation). Default (initial) device settings may include control parameters such as an output power table and other settings that control the operation of wireless circuitry 18. These settings may include, for example, settings for controlling Vbias, DAC values, gain stage state settings, settings that control how device 10 responds to various transmit power histories, settings that device 10 uses in determining how to adjust circuitry 18 in response to measured variables such as temperature, internally measured tapped power values (feedback), etc.

Changes in some of these parameters may affect others, so the process for controlling radio-frequency output power in device 10 may or may not be straightforward to model in equipment 106. For example, in some situations, control parameters in device 10 may be inaccessible to equipment 106, making effective modeling difficult or impossible. In other situations, equipment 106 may be able to accurately model how device 10 will respond to at least some of these control parameters. Calibration operations by equipment 106 may therefore be tailored depending on the type of device that is being calibrated.

At step 154, one or more transmit power requests may be conveyed from equipment 106 to device 10. In some situations, it is only desirable to send a single request at a time. In this type of arrangement, it may be desirable to repeatedly calibrate device 10 until a desired level of calibration has been achieved. In other situations, throughput may be enhanced by queuing and processing multiple transmit power requests. With this type of approach, multiple power requests may be formulated and transmitted to device 10 during the operations of step 154.

By using transmit power requests rather than commands that direct device 10 to use particular control parameters to produce a corresponding output power, equipment 106 is able to directly characterize how device 10 operates along line 120 of FIG. 5 (e.g., at points 122). This eliminates the need for equipment 106 to implement complex models of the relationships between control parameters and output power in device 10. Particularly in situations in which proper control parameter selection depends on actual rather than intended output powers, use of power requests rather than direct iteration through control parameters may help to reduce or eliminate sources of test error.

Each output power request that is received and processed by device 10 results in a corresponding actual transmitted radio-frequency power. At step 156, equipment 106 may measure the actual output power corresponding to each requested output power.

At step 158, equipment 106 may analyze the measurement results to determine what actions should be taken to calibrate device 10. Equipment 106 may, for example, produce corrective information (calibration information) to provide to device 10 during step 160. The operations of steps 154, 156, and 158 may be repeated if desired to ensure a satisfactory level of calibration has been obtained. Once device 10 has been sufficiently calibrated, device 10 may be operated by a user (step 162).

Because equipment 106 has requested particular output powers during step 154, equipment 106 can determine whether device 10 is operating accurately at step 158 without implementing a full functional model of the operation of device 10. Device 10 may, for example, implement an operating algorithm that is not completely accessible to equipment 106 (e.g., because some of the parameters, equations, or hardware mechanisms that are used in device 10 to produce a given output power are not modeled, are embedded within an inaccessible portion of device 10, or are otherwise not available to equipment 106). Even in this situation, equipment 106 can effectively analyze the test measurements made during the operations of step 156 to produce corrective information for device 10.

The corrective information that equipment 106 produces to calibrate device 10 may take any desired form. Examples of suitable corrective information include fully-calibrated output power tables, offset values for control parameters (e.g., corrective offsets for device 10 to use for Vbias, DAC value), output power offsets for device 10, etc. After device 10 has been provided with this corrective information, device 10 will operate in a calibrated fashion. For example, if device 10 is producing an output power Pout by looking up appropriate Vbias and DAC settings in a table, following the implementation of suitable corrective offsets in Vbias and/or DAC or following the loading of an entirely new table, device 10 will produce accurate output powers.

In some situations, it may be desirable for the corrective information that is provided by equipment 106 to device 10 to include only corrective information for a subset of the control parameter information that is used by device 10. For example, device 10 may produce output power Pout based on control parameters a, b, c, and d. The corrective information that is provided by equipment 106 to device 10 during step 160 may only correct parameters a and b (as an example). The corrective information (in this example) may only include a calibrating offset in parameter a and a calibrating offset in parameter b that are to be used to device 10 to produce accurate output powers.

It may also be desirable to provide corrective information from equipment 106 to device 10 using calibration parameters that are inputs to potentially complex functions of multiple control parameters. Consider, as an example, a situation in which curve 120 of FIG. 4 is a hyperbolic output power characterizing function f(Vbias, DAC, Q, and R), where Vbias and DAC represent the power amplifier bias voltage and transceiver DAC value used by device 10 and Q and R represent constants that define the shape of the hyperbolic function). During the calibration operations of step 158, equipment 106 may process the measurement results of step 156 to determine optimal calibrated values of Q and R. The values of Q and R may then be used as some or all of the corrective information that is provided to device 10 during step 160.

In operation of device 10, Q and R are affected by numerous factors, which may be difficult or impossible to independently ascertain. Nevertheless, because equipment 106 has requested that device 10 produce particular output powers, rather than attempting to directly adjust the underlying control parameters that produce those output powers, the analysis operations of step 158 can determine a best fit for Q and R without need to understand all underlying influences on the value of the output power that is produced. The values of Q and R (in this example) may therefore be sufficient to calibrate device 10.

Corrective information (e.g., the function parameter values Q and R in this present example) may represent curve slopes, curve shapes, curve offsets (e.g., intercepts), constants in hyperbolic functions or other functions, etc. In the present examples, particular types of corrective information have been described to illustrate how device 10 may be calibrated based on analyzing the results of the output power requests. These examples are, however, merely illustrative. Any suitable corrective information may be provided to device 10 to calibrate device 10 if desired.

The foregoing is merely illustrative of the principles of this invention and various modifications can be made by those skilled in the art without departing from the scope and spirit of the invention.

What is claimed is:

1. A method for calibrating an electronic device that contains wireless circuitry, comprising:
   with equipment that is electrically connected to the electronic device, providing a transmit power request to the electronic device that directs the electronic device to wirelessly transmit radio-frequency signals at a desired output power; and
   with the equipment, measuring an actual output power of radio-frequency signals transmitted from the electronic device in response to the transmit power request, wherein the wireless circuitry includes transceiver circuitry that is controlled by a transceiver control signal and includes power amplifier circuitry that receives a bias voltage, and wherein providing the transmit power request comprises requesting that the electronic device identify which value of the transceiver control signal and which value of the bias voltage to use to produce the desired output power.

2. The method defined in claim 1 further comprising:
   comparing the desired output power and the actual output power.

3. The method defined in claim 2 further comprising:
   computing a new value of the transceiver control signal without adjusting the bias voltage.

4. The method defined in claim 3 wherein computing the new value of the transceiver control signal comprises computing the new value of the transceiver control signal based on the desired output power from the transmit power request and based on the measured actual output power.

5. The method defined in claim 4 further comprising:
   computing the new value of the transceiver control signal only when comparison of the desired output power and the actual output power indicates that the desired output power and the actual output power differ by more than a predetermined threshold.

6. The method defined in claim 1 wherein the electronic device comprises a cellular telephone and wherein providing the transmit power request comprises providing the transmit power request to the cellular telephone over a wired path that contains at least two wires.

7. The method defined in claim 6 further comprising:
processing multiple actual output power output measurements, transceiver control signal settings, and power amplifier bias voltage settings to determine calibrated values of an output power table.

8. The method defined in claim 7 further comprising:
with the equipment, loading the calibrated values of the output power table into the electronic device.

9. The method defined in claim 1, wherein the equipment and the electronic device are electrically connected by a wired path, wherein the wireless circuitry includes transceiver circuitry that is controlled by a transceiver control signal and includes power amplifier circuitry that receives a bias voltage, and wherein providing the transmit power request comprises sending the transmit power request from the equipment to the electronic device over the wired path without using the equipment to supply the electronic device with a value for the transceiver control signal over the wired path and without using the equipment to supply the electronic device with a value for the bias voltage over the wired path.

10. The method defined in claim 1 further comprising:
analyzing at least the desired output power and the actual output power to produce calibration information for the electronic device.

11. The method defined in claim 10 wherein analyzing comprises producing at least one parameter value for an output power characterizing function.

12. The method defined in claim 10 wherein the calibration information includes a plurality of function parameter values for the output power characterizing function.

13. A method for testing a cellular telephone that has a radio-frequency transceiver that produces radio-frequency signals at a power controlled by radio-frequency transceiver control signals, power amplifier circuitry that receives the radio-frequency signals produced by the transceiver and that provides corresponding amplified radio-frequency output signals, wherein the power amplifier circuitry is powered using an adjustable bias voltage, the method comprising:
with test equipment, providing a transmit power request to the cellular telephone that directs the electronic device to provide the amplified radio-frequency output signals at a desired output power;
measuring power for the amplified radio-frequency output signals provided by the power amplifier circuitry in response to the transmit power request;
determining whether the measured power differs from the desired output power by more than a predetermined threshold; and
in response to determining that the measured output power differs from the desired output power by more than the predetermined threshold, computing an updated radio-frequency transceiver control signal setting to be used by the electronic device when attempting to produce the desired output power, wherein computing the updated radio-frequency transceiver control setting comprises holding the adjustable bias voltage at a fixed value while updating the radio-frequency transceiver control setting.

14. The method defined in claim 13 further comprising:
transmitting a plurality of the transmit power requests to the cellular telephone over a wired path between the cellular telephone and the test equipment; and
making actual power measurements indicative of how much actual power is associated with the amplified radio-frequency output signals produced in response to each transmit power request.

15. The method defined in claim 14 further comprising:
computing calibrated settings for an output power control curve based on the actual power measurements.

16. The method defined in claim 15 further comprising:
storing the calibrated settings in the cellular telephone to calibrate the cellular telephone.

17. The method defined in claim 13 further comprising:
producing corrective information for the cellular telephone that includes at least one function parameter value for an output power characterizing function; and;
storing the corrective information in the cellular telephone to calibrate the cellular telephone.

* * * * *